US009105247B2

(12) United States Patent
Lin et al.

(10) Patent No.: US 9,105,247 B2
(45) Date of Patent: Aug. 11, 2015

(54) DISPLAY DEVICE, DISPLAY DEVICE DRIVING METHOD AND SOURCE DRIVING CIRCUIT

(75) Inventors: Yi-Fan Lin, Hsin-Chu (TW); Mu-Lin Tung, Hsin-Chu (TW); Chao-Ching Hsu, Hsin-Chu (TW)

(73) Assignee: AU OPTRONICS CORP., Hsinchu (TW)

( * ) Notice: Subject to any disclaimer, the term of this patent is extended or adjusted under 35 U.S.C. 154(b) by 555 days.

(21) Appl. No.: 12/848,717

(22) Filed: Aug. 2, 2010

(65) Prior Publication Data

US 2011/0248985 A1 Oct. 13, 2011

(30) Foreign Application Priority Data

Apr. 8, 2010 (TW) ................................ 99110953 A

(51) Int. Cl.
*G06F 3/038* (2013.01)
*G09G 3/36* (2006.01)

(52) U.S. Cl.
CPC ...... *G09G 3/3614* (2013.01); *G09G 2300/0426* (2013.01); *G09G 2330/021* (2013.01)

(58) Field of Classification Search
CPC .......... G09G 2330/021; G09G 3/3648; G09G 2310/027; G09G 2320/0204; G09G 3/3611; G09G 3/3696
USPC ........................ 345/94–96, 98–100, 208–213
See application file for complete search history.

(56) References Cited

U.S. PATENT DOCUMENTS 7,215,311 B2 5/2007 Kim
7,471,275 B2 * 12/2008 Shieh et al. ..................... 345/98
2004/0263507 A1 * 12/2004 Sun ............................... 345/212
2006/0158418 A1 * 7/2006 Kieschnick et al. .......... 345/100
2006/0214898 A1 9/2006 Woo et al.
2006/0262069 A1 11/2006 Do et al.
2006/0274013 A1 * 12/2006 Lin et al. ......................... 345/98
2007/0046613 A1 * 3/2007 Ha et al. ........................... 345/98
2007/0234152 A1 * 10/2007 Kwon et al. .................. 714/726
2009/0015297 A1 * 1/2009 Chen et al. .................... 327/108
2010/0188374 A1 * 7/2010 Chen et al. .................... 345/204
2010/0265410 A1 * 10/2010 Sugihara et al. .............. 348/731

(Continued)

FOREIGN PATENT DOCUMENTS

TW 200634714 3/2010
TW 201039324 A * 11/2010 ...................... 345/87

OTHER PUBLICATIONS

Taiwan Patent Office, "Office Action", Sep. 24, 2013.

*Primary Examiner* — Abbas Abdulselam
*Assistant Examiner* — Gerald Oliver
(74) *Attorney, Agent, or Firm* — WPAT, PC; Justin King

(57) ABSTRACT

A display device includes multiple first data lines, multiple second data lines, multiple pixel columns, at least a first charge sharing switch circuit and at least a second charge sharing switch circuit. The second data lines are alternately arranged with the first data lines. Each of the pixel columns includes multiple first pixels and multiple second pixels. The first pixels of each of the pixel columns are coupled to one of the first data lines, and the second pixels of each of the pixel columns are coupled to one of the second data lines. The first charge sharing switch circuit each is electrically coupled to at least a part of the first data lines. The second charge sharing switch circuit each is electrically coupled to at least a part of the second data lines. A display device driving method and a source driving circuit also are provided.

13 Claims, 5 Drawing Sheets

(56) References Cited

U.S. PATENT DOCUMENTS

2010/0289791 A1* 11/2010 Weng .......................... 345/213
2011/0007052 A1* 1/2011 Shih et al. .................... 345/211
2011/0090190 A1* 4/2011 Lin ............................ 345/205

* cited by examiner

DISPLAY DEVICE, DISPLAY DEVICE DRIVING METHOD AND SOURCE DRIVING CIRCUIT

BACKGROUND

1. Technical Field

The present invention generally relates to display technology fields and, particularly to a display device structure, a display device driving method and a source driving circuit structure.

2. Description of the Related Art

Nowadays, liquid crystal display devices have many advantages of high display quality, small volume, lightweight and wide application range and thus are widely used in consumer electronics products such as mobile phones, laptop computers, desktop computers and televisions, etc. Moreover, the liquid crystal display devices have evolved into a mainstream display device in place of cathode ray tube (CRT) display devices.

In regard to the liquid crystal display device, since the property of liquid crystal materials polarities of voltages applied on a liquid crystal cell of pixel are needed to be alternately switched, and the process of the polarities of voltages applied on the liquid crystal cell being switched along the change of image pixel is termed as polarity inversion. Current polarity inversions primarily can be divided into three driving types of frame inversion, column inversion and dot inversion. The frame inversion driving type would cause the liquid crystal display device to occur annoying flicker, and thus the column inversion and dot inversion driving types are usually adopted. As to the column inversion and dot inversion driving types, the dot inversion driving type can give better display quality but the power consumption is larger than that of the column inversion driving type.

Accordingly, a liquid crystal display device adopting a zigzag pixel arrangement has been proposed. In particular, a part of pixels of a pixel column arranged between two adjacent data lines are electrically coupled to one of the data lines, and the other part of pixels of the pixel column are electrically coupled to the other one of the data lines, so that the employment of the power-saving column inversion driving type can achieve a same visual effect as the dot inversion driving type, however, at the circumstance of displaying single color (R, G or B) or complementary color (R+G, G+B, or B+R) images, there is about ⅔ number of data lines continuously charged and discharged with high frequency, so that the power consumption still is large. In another aspect, the prior art has proposed a solution of charge sharing (i.e., data lines respectively given positive and negative polarities are connected together to mutually share charges before polarities are inversed), and about 50% dynamic power theoretically can be saved; however, it is unfeasible to make the data lines with the respective positive and negative polarities to share charges in the liquid crystal display device adopting both the zigzag pixel arrangement and column inversion driving type, or else, much more power consumption is caused.

BRIEF SUMMARY

Accordingly, the present invention is directed to a display device, can use a charge sharing operation to achieve the purpose of save power.

The present invention is further directed to a display device driving method, using a charge sharing operation to achieve the purpose of save power.

The present invention is still further directed to a source driving circuit, endowed with charge sharing function.

More specifically, a display device in accordance with an embodiment of the present invention includes a plurality of first data lines, a plurality of second data lines, a plurality of pixel columns, at least a first charge sharing switch circuit and at least a second charge sharing switch circuit. The second data lines are alternately arranged with the first data lines. Each of the pixel columns includes a plurality of first pixels and a plurality of second pixels. The first pixels of each of the pixel columns are electrically coupled to one of the first data lines, and the second pixels of each of the pixel columns are electrically coupled to one of the second data lines. The at least a first charge sharing switch circuit each is electrically coupled to at least a part of the first data lines, and the at least a second charge sharing switch circuit each is electrically coupled to at least a part of the second data lines.

In one embodiment, the display device further includes a channel switch circuit and an output stage circuit. The output stage circuit is for providing the first data lines and the second data lines respectively with display data having opposite polarities. The output stage circuit includes a plurality of output channels. The output channels are respectively electrically coupled to the first and second data lines through the channel switch circuit.

In one embodiment, the first and second pixels of the pixel columns include M type of colored pixels, where M is a positive integer and no less than 3. The amount of the at least a part of the first data lines is a positive integer multiple of M, and the amount of the at least a part of the second data lines also is a positive integer multiple of M.

In one embodiment, the M type of colored pixels include a red pixel, a green pixel and a blue pixel.

The first pixels of each of the pixel columns are periodically arranged e.g., alternately arranged with the second pixels of the pixel column along a lengthwise direction of the pixel column.

A display device driving method in accordance with another embodiment of the present invention is adapted for a display device. Herein, the display device includes a plurality of data lines. Each adjacent two of the data lines have a plurality of pixels arranged therebetween, a part of the pixels being electrically coupled to one of the adjacent two data lines, and another part of the pixels being electrically coupled to the other one of the adjacent two data lines. In the exemplary embodiment, the display device driving method includes the following steps of: providing each of the data lines with a display data having a predetermined polarity; and demarcating the data lines provided with the display data having same polarity into at least one group and performing a charge sharing operation on each of the at least one group, while the data lines provided with the display data having different polarities mutually being not performed with the charge sharing operation.

In one embodiment, when the display device further includes an output stage circuit and a channel switch circuit, the output stage circuit being for providing the display data and including a plurality output channels, the output channels being respectively electrically coupled to the data lines through the channel switch circuit, the charge sharing operation is performed in a switch-off period of the channel switch circuit.

In one embodiment, the charge sharing operation is performed in each the switch-off period of the channel switch circuit.

In one embodiment, two adjacently performed charge sharing operations are spaced with at least one switch-off period.

A source driving circuit in accordance with still another embodiment of the present invention includes a plurality of first display data output terminals, a plurality of second display data output terminals, a channel switch circuit, an output stage circuit, a plurality of first charge sharing switch circuits and a plurality of second charge sharing switch circuits. The output stage circuit is for providing the first display data output terminals and the second display data output terminals with display data having opposite polarities. The output stage circuit includes a plurality of output channels. The output channels are respectively electrically coupled to the first and second display data output terminals through the channel switch circuit. Each of the first charge sharing switch circuits are electrically coupled to a part of the first display data output terminals, and each of the second charge sharing switch circuits are electrically coupled to a part of the second display data output terminals.

In one embodiment, when the source driving circuit is used in a display device including M type of colored pixels, where M is a positive integer and no less than 3, the amount of the part of the first display data output terminals electrically coupled to any one of the first charge sharing switch circuits as well as the amount of the part of the second display data output terminals electrically coupled to any one of the second charge sharing switch circuits both are positive integer multiples of M.

In summary, the above-mentioned embodiments of the present invention employ at least one first charge sharing switch circuit and at least one second charge sharing switch circuit, which facilitates multiple data lines provided with display data having same polarity to mutually share charges, while data lines provided with display data having different polarities mutually are not performed with charge sharing. Accordingly, it is feasible for the display device adopting both zigzag pixel arrangement and column inversion driving type to perform the charge sharing operation and thereby achieving better power saving effect.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

In the following detailed description of the preferred embodiments, reference is made to the accompanying drawings which form a part hereof, and in which are shown by way of illustration specific embodiments in which the invention may be practiced. In this regard, directional terminology, such as "row," "column," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," and "coupled" and variations thereof herein are used broadly and encompass direct and indirect connections, and couplings. Accordingly, the drawings and descriptions will be regarded as illustrative in nature and not as restrictive.

Figure 1:
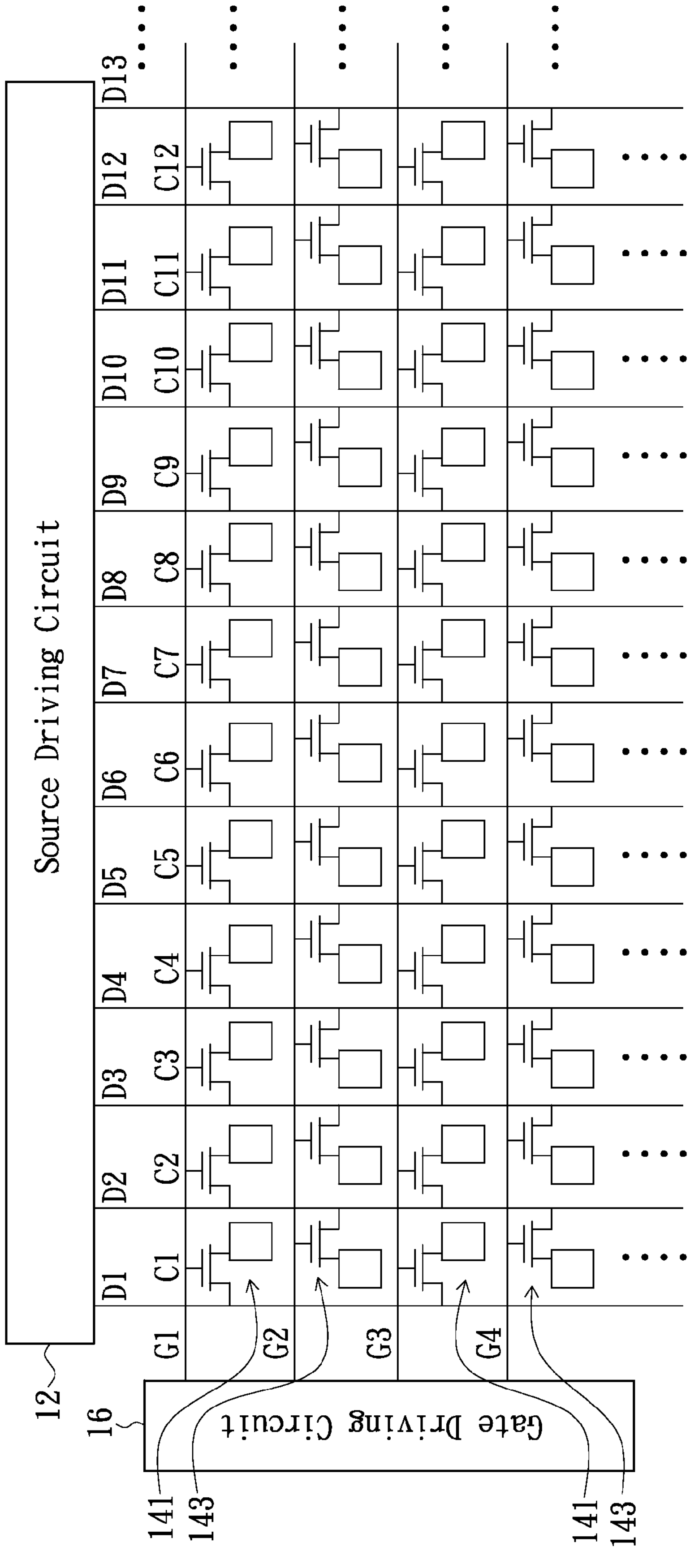
FIG. 1 shows a schematic partial structural diagram of a display device in accordance with an embodiment of the present invention.

Referring to FIG. 1, showing a schematic partial structural diagram of a display device in accordance with an embodiment of the present invention. As illustrated in FIG. 1, the display device 10 adopts a zigzag pixel arrangement. The display device 10 includes a source driving circuit 12, a gate driving circuit 16, pixel columns e.g., C1~C12, data lines e.g., D1~D13, and scan lines e.g., G1~G4.

The data lines D1~D13 include odd data lines D1, D3, D5, D7, D9, D11, D13 and even data lines D2, D4, D6, D8, D10, D12. The odd data lines D1, D3, D5, D7, D9, D11, D13 are alternately arranged with the even data lines D2, D4, D6, D8, D10, D12. Each of the pixel columns C1~C12 includes multiple first pixels 141 and multiple second pixels 143. The first pixels 141 of each of the pixel columns C1~C12 are electrically coupled to one of the odd data lines D1, D3, D5, D7, D9, D11, D13, and the second pixels 143 of each of the pixel columns C1~C12 are electrically coupled to one of the even data lines D2, D4, D6, D8, D10, D12. As seen from FIG. 1, the first pixels 141 of each of the pixel columns C1~C12 are periodically arranged with the second pixels 143 of the pixel column along a lengthwise direction of the pixel column, e.g., the first pixels 141 are alternately arranged with the second pixels 143 along the lengthwise direction as shown in FIG. 1.

Figure 2:
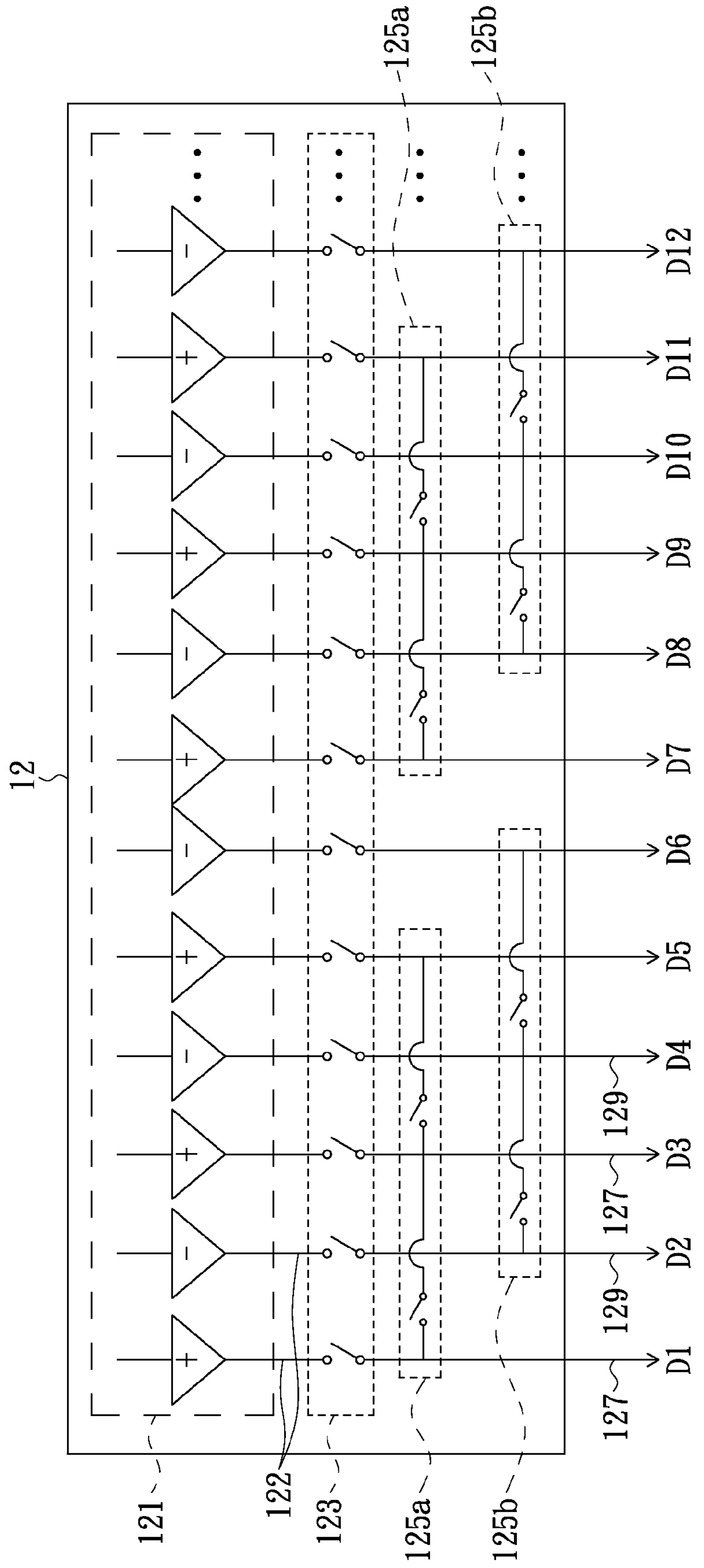
FIG. 2 shows a schematic internal structure diagram of a source driving circuit of the display device in FIG. 1.

Referring to FIG. 2, showing a schematic internal structure of the source driving circuit 12 in FIG. 1. The source driving circuit 12 has multiple odd display data output terminals 127 and multiple even display data output terminals 129. The odd display data output terminals 127 and the even display data output terminals 129 respectively serves as output terminals for outputting display data with different (i.e., generally opposite) polarities. As illustrated in FIG. 2, the odd display data output terminals 127 are for providing the odd data lines D1, D3, D5, D7, D9, D11 with display data having a first polarity (e.g., positive polarity), and the even display data output terminals 129 are for providing the even data lines D2, D4, D6, D8, D10, D12 with display data having a second polarity (e.g., negative polarity).

An internal structure of the source driving circuit 12 includes an output stage circuit 121, a channel switch circuit 123, multiple first charge sharing switch circuit 125*a* and multiple second charge sharing switch circuit 125*b*. The output stage circuit 121 is for providing display data with predetermined polarities and delivering the display data to the channel switch circuit 123 through multiple output channels 122 thereof. Each of the first charge sharing switch circuits 125*a* is electrically coupled to a plurality of the odd display data output terminals 127, and each of the second charge sharing switch circuits 125*b* is electrically coupled to a plurality of the even display data output terminals 129. More specifically, in regard to a display device adopting M type of colored pixels e.g., three primary colored pixels of red pixel, green pixel and blue pixel, the amount of the odd display data output terminals 127 electrically coupled to the same one of the first charge sharing switch circuits 125*a* preferably is a positive integer multiple (e.g., one multiple, two multiple or much more multiple) of M, and the amount of the even display data output terminals 129 electrically coupled to the same one of the second charge sharing switch circuits 125*b* preferably is a positive integer multiple (e.g., one multiple, two multiple or much more multiple) of M. Herein, the channel switch circuit 123, the first charge sharing switch circuits 125*a* and the second charge sharing switch circuits 125*b* each is a switch element array including multiple switch elements.

It is noted that, although multiple first charge sharing switch circuits 125*a* and multiple second charge sharing switch circuits 125*b* are illustrated in the present embodiment, so that the odd display data output terminals 127 as well as the even display data output terminals 129 are demarcated into multiple groups, but it is not to limit the present invention. In another embodiment, the source driving circuit 12 can only include a single first charge sharing switch circuit 125*a* and a single second charge sharing switch circuit 125*b*, so that the odd display data output terminals 127 as well as the even display data output terminals 129 are demarcated into a single group.

Figure 3:
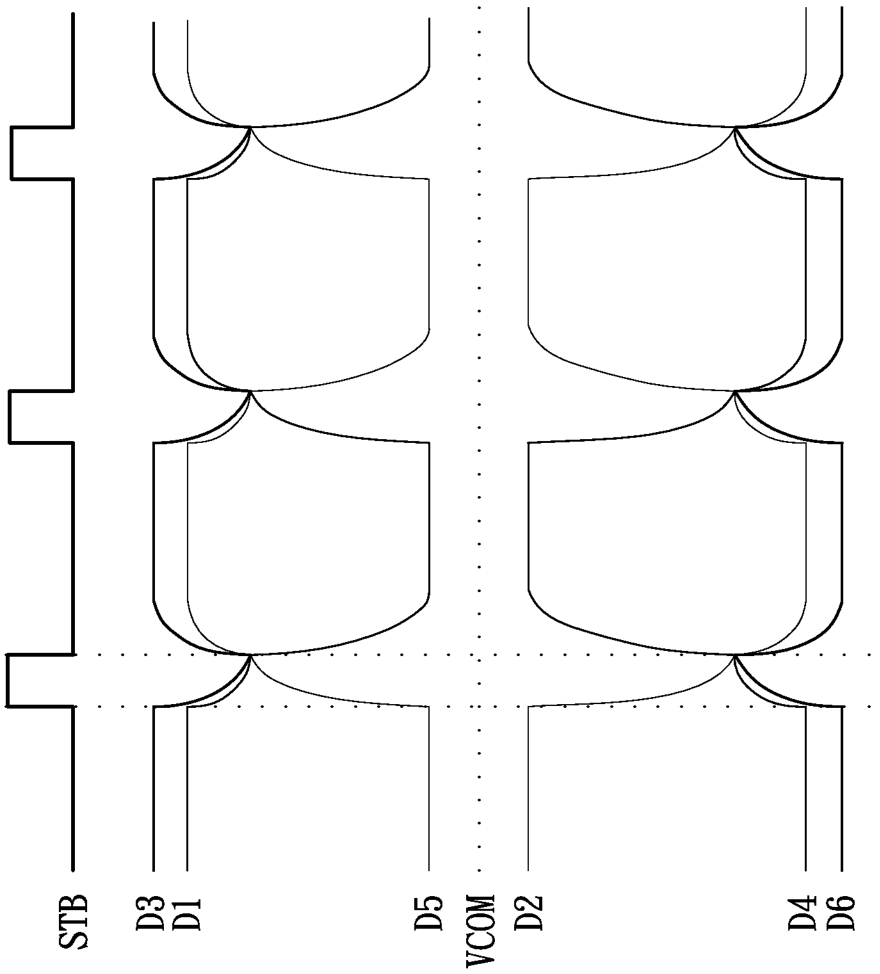
FIG. 3 shows schematic signal timing diagrams associated with multiple data lines of the display device in FIG. 1 being performed with a charge sharing operation.

Referring to FIGS. 1 through 3 together, FIG. 3 showing signal timing diagrams associated with multiple data lines being performed with a charge sharing operation. In particular, in an operation process of the display device 10, display data with predetermined polarities are provided to the data lines e.g., D1~D6 through the output stage circuit 121. For example, the display data with positive polarity are provided to the odd data lines D1, D3, D5, and the display data with negative polarity are provided to the even data lines D2, D4, D6. At this moment, an enable signal STB is logic low level, and the channel switch circuit 123 is turned on. Herein, when the display data provided to the data line having a voltage level higher than a common voltage VCOM, the display data is termed as positive polarity display data, whereas when the display data provided to the data line having a voltage level lower than the common voltage VCOM, the display data is termed as negative polarity display data.

Subsequently, when the enable signal STB changes to be logic high level, the channel switch circuit 123 is turned off (i.e., generally switched off), the first charge sharing switch circuit 125*a* electrically coupled to the odd data lines D1, D3, D5 is turned on, the second charge sharing switch circuit 125*b* electrically coupled to the even data lines D2, D4, D6 is turned on, the odd data lines D1, D3, D5 mutually share charges due to the turned-on first charge sharing switch circuit 125*a*, and the even data lines D2, D4, D5 mutually share charges due to the turned-on second charge sharing switch circuit 125*b*, so that an average of charge swings of data lines with same polarity during displaying a single color or complementary color image is about ⅔ of the prior art, achieving better power saving effect. In addition, the charge sharing operation for the odd data lines D7, D9, D11 is similar to that for the odd data lines D1, D3, D5, and the charge sharing operation for the even data lines D8, D10, D12 is similar to that for the even data lines D2, D4, D6, hence they are not repeated herein. Moreover, as seen from FIG. 3, the charge sharing operation for data lines with same polarity is performed in each period of the enable signal STB being logic high level, i.e., switch-off period of the channel switch circuit 123.

Figure 4:
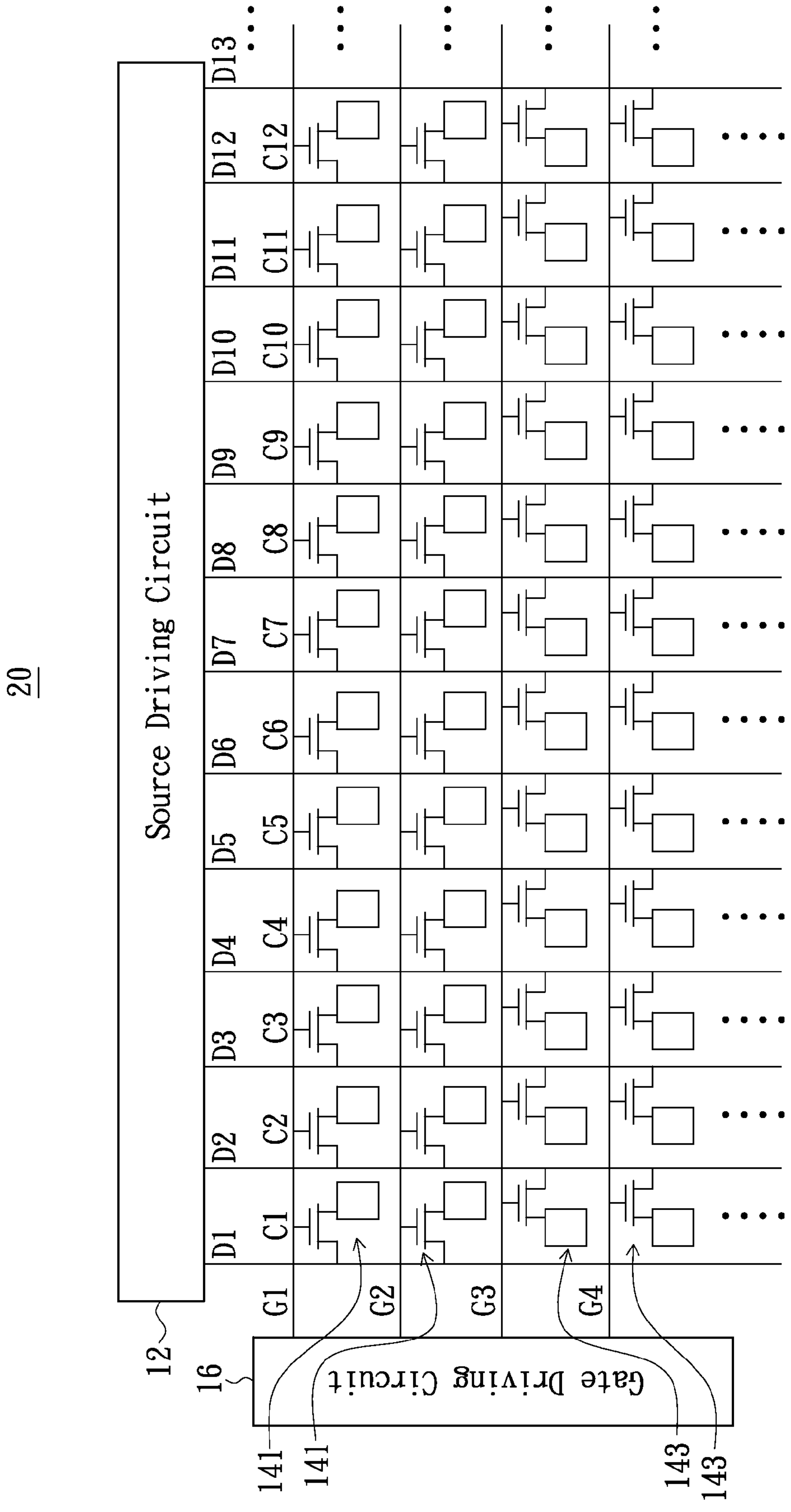
FIG. 4 shows a schematic partial structural diagram of a display device in accordance with another embodiment of the present invention.
Figure 5:
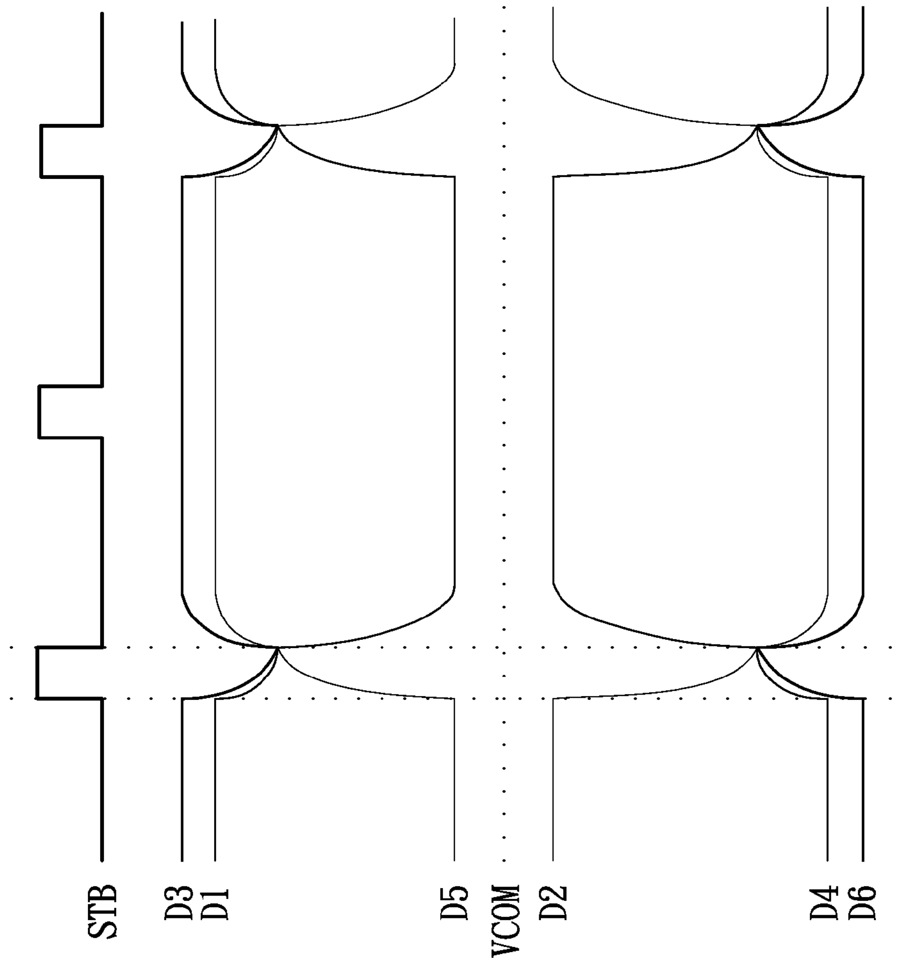
FIG. 5 shows schematic signal timing diagrams associated with multiple data lines of the display device in FIG. 4 being performed with a charge sharing operation.

Additionally, the display device in accordance with the embodiment of the present invention is not limited the structure as illustrated in FIG. 1, the first pixels 141 and the second pixels 143 of each of the pixel columns e.g., C1~C12 can employ other type of periodical arrangement for example, taking multiple first pixels and multiple second pixels arranged in a sequence manner as a repeating unit and the amount of the first pixels in the repeating unit being the same as or different from that of the second pixels, or the first pixels and the second pixels in each of the pixel columns are randomly arranged. Corresponding to different pixel arrangements, in order to realize the maximum efficiency of a charge sharing operation for data lines provided with same polarity display data, a time/an occasion to perform the charge sharing operation ought to be given corresponding adjustment. As illustrated in FIG. 4, the display device 20 has a similar structure with the display device 10 as shown in FIG. 1, a difference is that: the first pixels 141 and the second pixels 143 of each of the pixel columns e.g., C1~C12 in the display device 20 are arranged in a manner of two first pixels and two second pixels arranged in sequence being taken as a repeating unit, which is different from the alternate arrangement of the first pixels 141 and the second pixels 143 (i.e., generally one first pixel and one second pixel arranged in sequence are taken as a repeating unit) of each of the pixel columns C1~C12 in the display device 10. In the situation of the illustration in FIG. 4, referring to FIG. 5, signal timing diagrams associated with multiple data lines of the display device 20 being performed with a charge sharing operation are illustrated. In particular, in order to realize the maximum efficiency of the charge sharing operation, the charge sharing operation advantageously is adjusted to be only performed with one time during the enable signal STB successively appears two times logic high level, that is, two adjacently performed charge sharing operations are spaced with one switch-off period of the channel switch circuit 123.

In summary, the above-mentioned embodiments of the present invention employ at least one first charge sharing switch circuit and at least one second charge sharing switch circuit, which facilitates multiple data lines provided with display data having same polarity to mutually share charges, while data lines provided with display data having different polarities mutually are not performed with charge sharing. Accordingly, it is feasible for the display device adopting both zigzag pixel arrangement and column inversion driving type to perform the charge sharing operation and thereby achieving better power saving effect.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A display device comprising:
- a plurality of first data lines;
- a plurality of second data lines, alternately arranged with the first data lines;
- a plurality of pixel columns, wherein each of the pixel columns comprises a plurality of first pixels and a plurality of second pixels, the first pixels of each of the pixel columns are electrically coupled to one of the first data lines, and the second pixels of each of the pixel columns are electrically coupled to one of the second data lines;

at least a first charge sharing switch circuit, each electrically coupled to at least data lines of the first data lines for sharing charges on the coupled data lines of the first data lines with a first polarity; and at least a second charge sharing switch circuit, each electrically coupled to at least two data lines of the second data lines for sharing charges on the coupled data lines of the second data lines with a second polarity opposite to the first polarity.

2. The display device as claimed in claim 1, further comprising:

a channel switch circuit; and an output stage circuit, for providing display data with a polarity to the first data lines and providing display data with another opposite polarity to the second data lines, wherein the output stage circuit comprises a plurality of output channels, the output channels being respectively electrically coupled to the first and second data lines through the channel switch circuit.

3. The display device as claimed in claim 1, wherein the first and second pixels of the pixel columns comprise M type of colored pixels, where M is a positive integer and no less than 3; an amount of the at least a part of the first data lines is a positive integer multiple of M, and an amount of the at least a part of the second data lines is a positive integer multiple of M.

4. The display device as claimed in claim 3, wherein the M type of colored pixels comprise a red pixel, a green pixel and a blue pixel.

5. The display device as claimed in claim 1, wherein the first pixels of each of the pixel columns are periodically arranged with the second pixels of the pixel column along a lengthwise direction of the pixel column.

6. The display device as claimed in claim 5, wherein the first pixels of each of the pixel columns are alternately arranged with the second pixels of the pixel column along the lengthwise direction of the pixel column.

7. The display device as claimed in claim 5, wherein every two adjacent first pixels of each of the pixel columns are divided into a first group and every two adjacent second pixels of each of the pixel columns are divided into a second group, the first group is alternately arranged with the second group along the lengthwise direction of the pixel column, the first group is connected to one of the first data lines and the second group is connected to one of the second data lines.

8. A display device driving method adapted to a display device, wherein the display device comprises a plurality of data lines, each adjacent two of the data lines having a plurality of pixels arranged therebetween, a part of the pixels being electrically coupled to one of the adjacent two data lines, and another part of the pixels being electrically coupled to the other one of the adjacent two data lines; the display device driving method comprising steps of:

providing each of the data lines with a display data having a predetermined polarity, every adjacent two data lines having opposite polarities; and demarcating the data lines provided with the display data having same polarity into at least one group and performing a charge sharing operation on each of the at least one group, while the data lines provided with the display data having different polarities mutually being not performed with the charge sharing operation.

9. The display device driving method as claimed in claim 8, wherein when the display device further comprises an output stage circuit and a channel switch circuit, the output stage circuit being for providing the display data and comprising a plurality of output channels, the output channels being respectively electrically coupled to the data lines through the channel switch circuit;

the charge sharing operation is performed in a switch-off period of the channel switch circuit.

10. The display device driving method as claimed in claim 9, wherein the charge sharing operation is performed in each the switch-off period of the channel switch circuit.

11. The display device driving method as claimed in claim 9, wherein two adjacently performed charge sharing operations are spaced with at least one switch-off period.

12. A source driving circuit comprising:

a plurality of first display data output terminals;

a plurality of second display data output terminals;

a channel switch circuit;

an output stage circuit, for providing display data with a polarity to the first display data output terminals and providing display data with another opposite polarity to the second display data output terminals, wherein the output stage circuit comprises a plurality of output channels, the output channels being respectively electrically coupled to the first and second display data output terminals through the channel switch circuit;

a plurality of first charge sharing switch circuit, wherein each of the first charge sharing switch circuit is electrically coupled to at least two display data output terminals of the first display data output terminals for sharing charges on the coupled display data output terminals of the first display data output terminals with a first polarity; and a plurality of second charge sharing switch circuit, wherein each of the second charge sharing switch circuit is electrically coupled to at least two display data output terminals of the second display data output terminals for sharing charges on the coupled display data output terminals of the second display data output terminals with a second polarity opposite to the first polarity.

13. The source driving circuit as claimed in claim 12, wherein when the source driving circuit is applied to a display device comprising M type of colored pixels, where M is a positive integer and no less than 3, an amount of the part of the first display data output terminals electrically coupled to any one of the first charge sharing switch circuits as well as an amount of the part of the second display data output terminals electrically coupled to any one of the second charge sharing switch circuits both are positive integer multiples of M.

* * * * *